United States Patent
Port

Patent Number: 5,713,620
Date of Patent: Feb. 3, 1998

[54] VAN RACK

[76] Inventor: Robert Persons Port, 12428 Matthews La., St. Louis, Mo. 63127

[21] Appl. No.: 743,147

[22] Filed: Nov. 4, 1996

[51] Int. Cl.$^6$ .................................................. B60R 9/00
[52] U.S. Cl. .............................. 296/3; 224/546; 224/555
[58] Field of Search ........................... 296/3; 224/539, 224/543, 545, 546, 547, 555, 556

[56] References Cited

U.S. PATENT DOCUMENTS

| | | | |
|---|---|---|---|
| 2,116,443 | 5/1938 | McMillen | 224/556 X |
| 2,797,852 | 7/1957 | Michalski | 224/546 |
| 4,927,032 | 5/1990 | Mercure | 296/3 X |
| 4,989,768 | 2/1991 | McNulty | 296/3 X |

FOREIGN PATENT DOCUMENTS

| | | | |
|---|---|---|---|
| 1203047 | 5/1958 | France | 296/3 |
| 2240516 | 8/1991 | United Kingdom | 296/3 |

*Primary Examiner*—Joseph D. Pape
*Attorney, Agent, or Firm*—Norman L. Wilson, Jr. Attorney

[57] ABSTRACT

There is a need for a carrier or rack enabling owners of passenger vans, and some delivery vans, to haul elongated objects. Such carriers or load carrying bracket attachments are provided herein for vans of the type having two sets of upper and lower external door leaf hinges. A rack element is adapted for each set of hinges, with the two cooperating or jointly forming the rack itself. Each rack element includes a support rail having upper and lower hanging brackets on its inner surface adapted to fit between the hinge leaves to hang on the upper and lower door hinges. A rigid arm attached to the front surface of the support rail extends outwardly as a boom for supporting objects such as ladders, plywood and the like which are to be carried by the van.

9 Claims, 3 Drawing Sheets

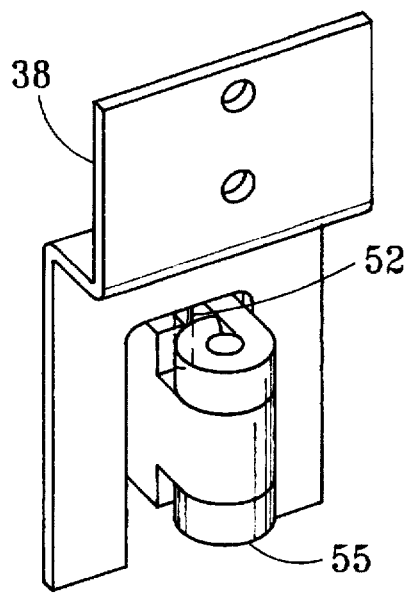
Fig. 6
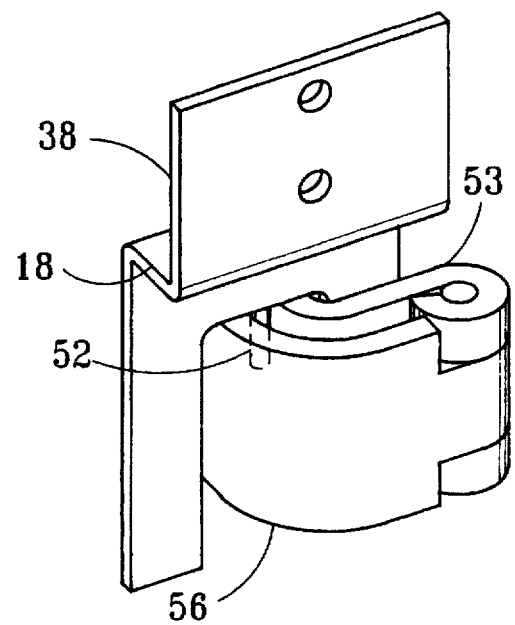
Fig. 7
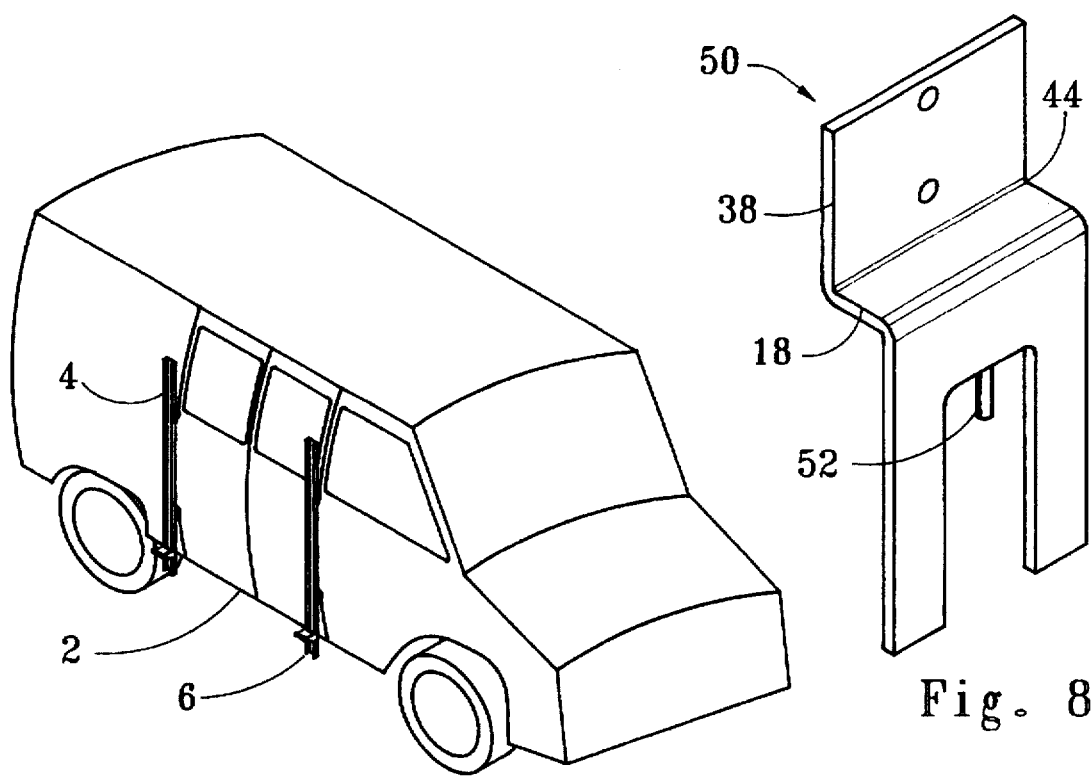
Fig. 1
Fig. 8

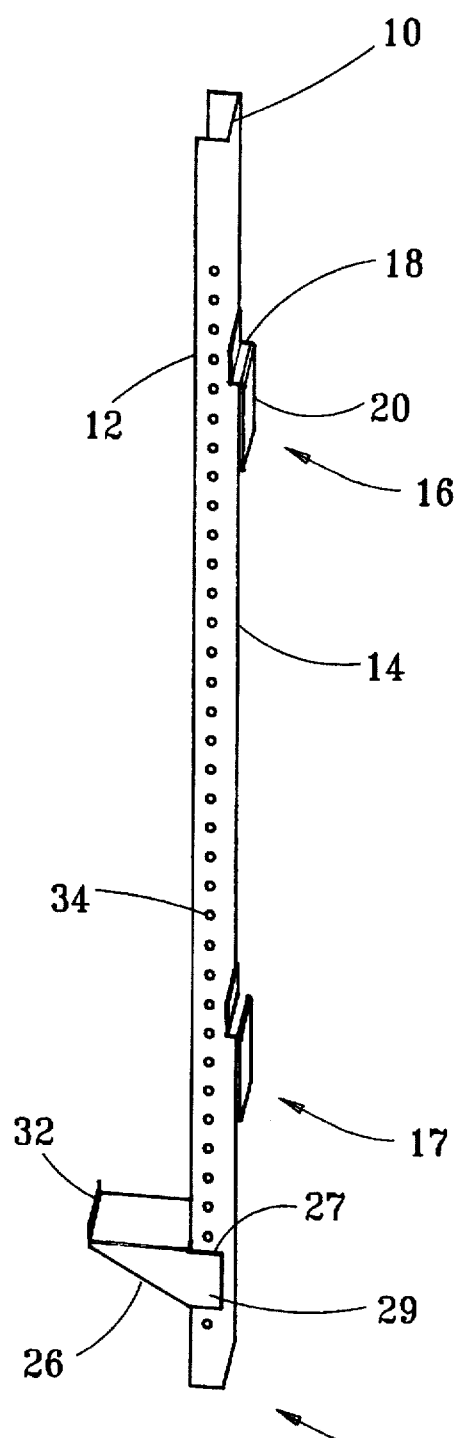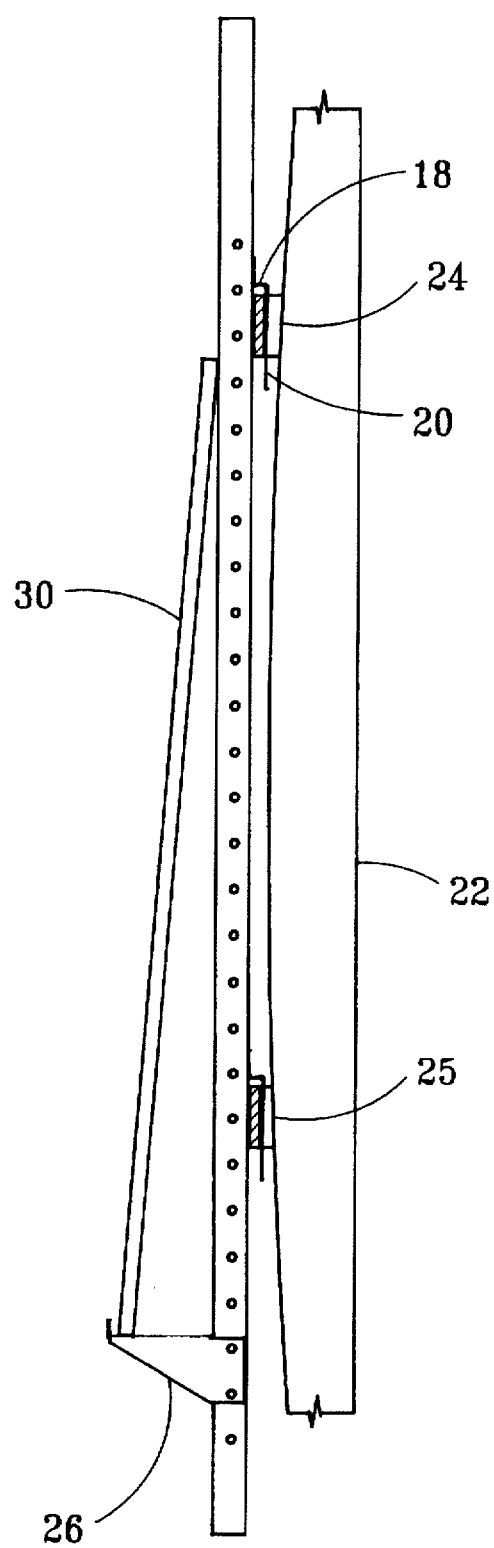
Fig. 2
Fig. 3

5,713,620

VAN RACK

FIELD OF THE INVENTION

This invention falls in the field of vehicle racks. In a more specific aspect the invention pertains to racks in the form of carriers for transporting objects on the sides of some vehicles and on the backs of others when the objects to be transported do not fit well inside that vehicle. In a still more specific aspect the invention pertains to load carrying bracket attachments for certain vans.

BACKGROUND OF THE INVENTION

The need for bracket attachments or racks supportable on the sides of automobiles for carrying and transporting large objects has long been recognized. As early as 1938, U.S. Pat. No. 2,116,443 suggested a bracket attachment for such use. The bracket was attached to an automobile by special removable door hinge pintles which were used in lieu of the usual door hinge pins.

In 1952 a carrier device, disclosed in U.S. Pat. No. 2,599,824, was provided with a shoulder adapted to rest on the lower edge of a window opening. A 1977 patent, U.S. Pat. No. 4,007,864, and a 1990 patent, U.S. Pat. No. 4,944,434, also describe carriers utilizing the bottom sides of windows.

U.S. Pat. No. 2,797,852, in 1957, suggested screwing or riveting plates to one of the sides of an automobile. A U-shaped struck-out portion on the plate received the carrying mechanism. In addition a 1995 patent, U.S. Pat. No. 5,388,738, discloses a side mounting rack which is inserted between the window glass and the door of a vehicle so that its outer section can resiliently engage the outer surface of the associated vehicle door panel. Further illustrating the need for racks for carrying ladders and other large objects are patents for similar devices for tracks, examples being U.S. Pat. No. 1,991,900, U.S. Pat. No. 4,989,768, and U.S. Pat. No. 5,350,095.

It is to be appreciated that despite the number of patents directed to passenger car carrying racks, none of the devices are readily adaptable to recreational vans having windows which do not open, and delivery vans having no windows. Such vans also have no rain gutters which can be put to such use. One could drill holes in the van body as suggested by U.S. Pat. No. 2,797,852, but this is not a practical solution for luxury vans. The problem of hauling such objects as ladders, lumber, poles, and posts, as well as sheets of plywood, wallboard, glass, plexiglass, and the like with vans, thus, has not been solved as evidenced by the prior art even though there is a definite need for a rack for vans. There is probably no universal solution to the problem. Herein, however, a rack is provided which is extremely useful and practical for certain types of vans.

An object of this invention, then, is to provide a rack enabling owners of one type of passenger van, and some delivery vans, to haul elongated objects. Another object of the invention is the provision of a van rack which can be easily installed on the van when it is to be used and can be easily removed when use is completed. Still another object is to supply a van rack in a kit form so that it can be readily transported when not in use.

SUMMARY OF THE INVENTION

The invention herein is an object transporting carrier for vans. The vans to which the invention applies are the type having two sets of upper and lower external door hinges. The carrier is in the form of a kit which includes two separate rack elements. One rack element is adapted for one set of hinges, and one rack element is adapted for a second set of hinges with the two cooperating or jointly forming the rack itself. Each rack element includes a longitudinal support rail having an inner and an outer surface. Upper and lower hanging brackets are attached to, and spaced on, the inner surface of the longitudinal support rail. These brackets are adapted to hook behind the upper and lower door hinges. The brackets can be so spaced on the vertical support rail that the upper and lower brackets are adjacent the upper and lower door hinges when the rack is in place. The rack element can then be hung on the hinges to support the rack element. A rigid arm is attached to the front surface of the vertical support rail. It extends outwardly from the vertical rail as a boom. This boom cooperates with the boom on the other vertical support rail, the two supporting objects such as ladders, plywood and the like which are to be carried by the van.

THE INVENTION

Vans having external door hinges are the larger of the vans made by automobile manufacturers. By "external hinges" I mean those leaf hinges which am not covered by door panels when the van doors are closed. They are still visible when the doors are closed. Such vans have been manufactured for at least twenty-four years, and probably longer. There are also delivery vans having two rear doors, each with upper and lower external hinges. The kit provided herein can be readily employed on these vans as well. By the term "kit" I signify that my invention includes two separate rack elements which are used cooperatively as a rack, but which, as separate elements, are much easier to handle, and take up less room when not in use. Despite the prior art previously alluded to, the idea of utilizing those hinges has not occurred to those interested in the hauling problem. The idea for a rack element hanging on each set of external leaf hinges has not surfaced, particularly in the form of a rack as compact and easy to store and transport as two bars or rails with hanging brackets attached thereto. This can be better understood by a detailed description of the invention in conjunction with drawings of one form of the invention.

DESCRIPTION OF THE DRAWINGS

FIG. 1 is a fragmentary view of a van showing one side equipped with the side mounting carrier of the invention.

FIG. 2 is a perspective view of one rack element of a carrier of the invention.

FIG. 3 is a fragmentary side view showing a rack element as attached to the side of a van and as it supports a panel.

FIG. 6 is a perspective view of a hinging bracket as modified for late model vans.

FIGS. 7 and 8 are perspective views showing the hanging bracket of FIG. 6 on two types of van door hinges.

DETAILED DESCRIPTION OF THE INVENTION

Figure 4:
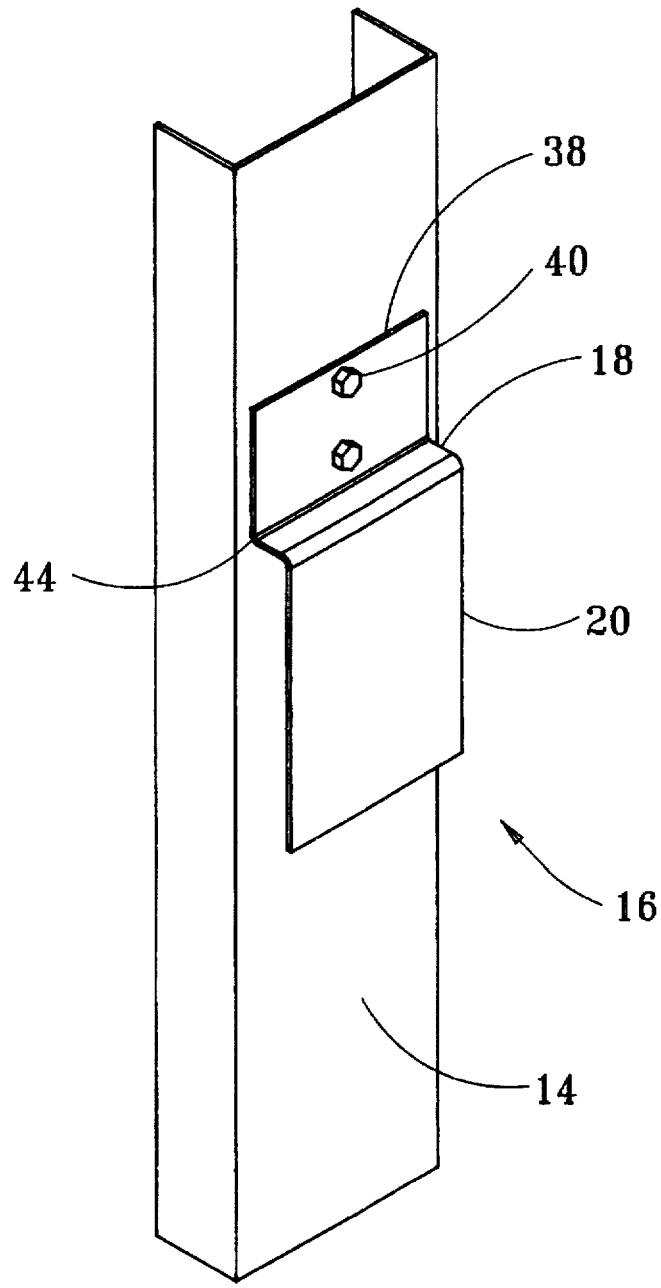
FIG. 4 is a perspective view showing one form of hanging bracket on the rack element utilized for early model vans.

Referring now to a preferred embodiment of the invention, in FIG. 1, numeral 2 is a sketch of a type of van on which the object carrier is to be used. As can be seen two rack elements 4 and 6 work together to form a rack constituting the carrier. The rack cannot be designated by an identifying numeral because it is in kit form, made up of separate rack elements 4 and 6 which will now be described. Since the two rack elements are identical, only one of them need be described.

The rack element (4 or 6) is best shown in FIG. 2. Its main component is a longitudinal rail 10 which is the body of the rack element. This rail extends longitudinally the length of rack element 4 and it determines the length of the rack. Longitudinal rail 10 has an outer surface 12, and an inner surface 14, the inner surface being that which faces or abuts the van, the outer surface being that which faces away from the van.

It is the inner surface 14 of the longitudinal rail 10 which carries upper and lower hanging brackets 16 and 17 which will support or hold the rack element in place during use as will be explained hereinafter. A hanging bracket for earlier van models is a fastener in the form of a plate and a lug. The plate includes a bend 44 forming two planes or plate portions 38 and 18 which form an angle of ninety degrees or greater with other because of the bend. As seen in FIG. 4, plate portion 38 is a flanged portion which can be bolted to the longitudinal rail using bolts 40. Plate portion 18 is attached to and extends outwardly from the inner support rail surface, with its free end away from plate portion 38. A lug 20 is integral with, and projects downwardly from, the plate free end. Extending downwardly from the free end of plate portion 18, that is the unattached edge of the plate, then, is a lug 20. As illustrated in FIG. 4, this lug is in the form of a metal strap or narrow downwardly depending plate rigidly affixed to the outer edge of plate 18 so that there is a space between strap 20 and the inner rail surface 14. The hanging bracket thus includes an angular plate and a lug. This hanging bracket can be seen clearly in FIG. 4. Through bolt attachment means, or adjustable means plate portion 38 is rigidly attached to the inner rail surface 14 so that plate portion 18 is directed outwardly therefrom. The bolt attachment means shown in FIG. 4 is desirable because of cost. However there are advanatages to having adjustable attachment means, especially the upper means so that the hanging bracket can be readily positioned opposite the upper hinge. This can be accomplished by a plurality of holes, not visible in the figures, in the inner support rail surface.

Referring again to FIG. 2, there are two hanging brackets secured to the inner rail surface 14, an upper hanging bracket 16, and a lower hanging bracket 17 whose functions will be herein described.

Figure 5:
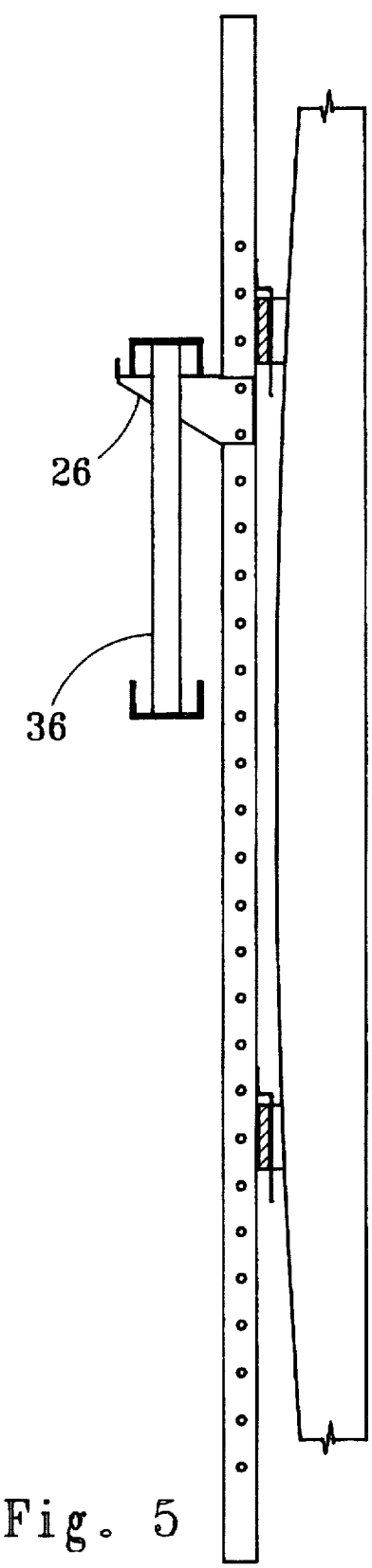
FIG. 5 is a fragmentary side elevation view showing a rack element as modified for carrying a ladder.

In addition to the two inner hanging brackets 16 and 17, the outer rail surface 12 carries an arm 26 in the form of a load supporting boom. This boom also could be welded to the rail surface. Preferably, however, the boom is provided with flanges 27 having holes which mate with holes 34 in longitudinal rail 10 so that arm 26 can be bolted to the rail using pins or bolts 29. A reason for this is illustrated in FIG. 5. When a ladder 36 is to be carried it is desirable to raise the boom or arm 26 so there is no possibility of interfering with steering or low objects along the way.

As noted, rack element 6 is identical to rack element 4 just described. Having described one of the two rack elements their use will now be explained. First, it is to be understood that upper and lower hanging brackets 16 and 17 are so spaced on the longitudinal support rail that they are adjacent the upper and lower door hinges when the support rail is in the vertical position in which it will be used. When hanging brackets 16 and 17 are so aligned the hanging brackets can be hooked over the tops of door hinges 24 and 25 with lugs 20 extending downwardly behind the hinges, that is, between the leaves of the leaf hinges of the door as illustrated in FIGS. 3 and 5. Plate 18 extends away from inner rail surface 14 a distance slightly greater than the hinge width so that lug 20 can be slipped between leaves of hinges 24 and 25 of a van door 22. Lug 20 is sized to fit in the space between the leaves of the hinge. Since the hanging brackets 16 and 17 are spaced to correspond to the spacing of van door hinges 24 and 25, rack element 4, in effect, can be hung on those hinges with the hanging brackets functioning as hooks as shown in FIG. 3. The hook portions or lugs 20 are long enough to prevent an empty hanging bracket from jumping off should the van encounter a bump in the mad. A panel 30 or other long or bulky object can then be placed on boom 26 as also illustrated in FIG. 3.

Whereas rack elements 4 and 6 could be connected, it will be appreciated that a framework extending across from hinge pair to hinge pair would be large and troublesome to transport and store when not in use. It would probably have to be disassembled to be carried within the van. Separate rack elements in kit form, therefore, afford a ready solution to the problem of providing an object transporting carrier for many of the vans on the road.

Having been given the teachings of this invention modifications and variations will occur to those in this field. It will be apparent, for instance, that hanging brackets 16 and 17 can be parts stamped as one piece elements as shown in FIG. 4, or as separate pieces, which are bolted, welded or otherwise joined together. And, as indicated, these hanging brackets can then also be bolted, welded or adjustably attached to the inner rail surface. It may be desirable to have a fixed lower bracket in combination with an adjustable upper bracket to easily match the hinges.

An important modification of the brackets involves the the use of interchangeable hanging brackets to take care of van model changes. To this end adjustable bracket attachment means are preferred for their removability. To have hanging brackets which fit various van models, or changes in van models, brackets can be slidable on rail 10. For different models, then, carriers can be changed by merely changing the hanging brackets. This is illustrated in FIGS. 6, 7, and 8. FIG. 6 depicts hinges 55 on late model Ford vans, whereas FIG. 7 illustrates leaf hinges used on late model General Motors and Chrysler vans. To fit these vans bracket 16 (FIG. 4) has been modified to bracket 50 of FIG. 8. It will be noted that the bracket still includes a plate and a lug. The plate portion 38 is still flanged for attachment to inner rail surface 14, and plate portion 18 still extends outwardly therefrom because of bend 44. Howeverthe lug is now a pin 52 instead of a strap 20 appearing in FIG. 4. As illustrated in FIGS. 6 and 7, when the brackets are hung the lugs still slip between the hinge leaves, seen as 52 and 53 of FIG. 7 as they did in earlier models (FIG. 3). In this instance, however, the space behind the hinge, that is, between the leaves of the leaf spring, is smaller. It accommodates a pin-shaped lug, but not a strap shaped lug.

Various shapes and sizes of load carrying arms or booms can also be attached to the outer longitudinal rail surface. In addition the boom can be provided with an outer end plate, flange, or lip 32 to prevent an object from working its way off of the end of the boom. Moreover the boom height can be adjusted. By the provision of a series of holes 34 the boom can be raised or lowered to fit the load size, or for a ladder as described in connection with FIG. 5. Likewise various methods, quick release or otherwise, are available for connecting boom 26 to longitudinal rail 10. The rail 10 itself is also subject to modification. Even though, as illustrated in FIG. 2, its preferred form is a U-shape, in cross-section, with its bifurcated members directed outwardly, that is, away from the van, it can be a bar with a square or rectangular cross-section. As another modification, whereas the rack elements will normally be constructed of metal, strong plastics are also available for such fabrications. These and other ramifications are, then, deemed to be within the scope of this invention.

What is claimed is:

1. An object transporting carrier for vans having two sets of upper and lower external door leaf hinges, the carrier being in the form of a kit including a pair of rack elements, one rack element of the pair being adapted for use with one of the two sets of door leaf hinges, and one rack element of the pair being adapted for use with the other set of the pair of door hinges, each rack element including a longitudinal support rail having an inner and an outer surface, spaced upper and lower hanging brackets each adapted for attachment to the inner support rail surface, and each bracket including means adapted to hook on the upper and lower door leaf hinges to support the rack element when the brackets are adjacent the hinges, bracket attachment means adapted to secure the hanging brackets on their inner rail surfaces so that they are so spaced on the longitudinal support rail that the upper and lower brackets are adjacent the upper and lower door hinges when the support rail is in a vertical position in which it is to be employed, and a rigid arm attached to the outer surface of each longitudinal support rail and extending outwardly therefrom as booms which cooperate with each other to form a rack which supports objects to be carried.

2. The object transporting carrier of claim 2 wherein the hanging brackets are adapted to fit front and rear side door hinges of passenger vans.

3. The object transporting carrier of claim 2 wherein the hanging brackets are adapted to fit rear door hinges of double door delivery vans.

4. The object transporting carrier of claim 2 wherein the hanging bracket attachment means are adjustable on the longitudinal support rail.

5. The object transporting carrier of claim 2 wherein the boom is provided with an end plate.

6. The object transporting carrier of claim 5 wherein the boom is adjustably attached to the longitudinal support rail.

7. The object transporting carrier of claim 1 wherein each hanging bracket includes a plate having a bend therein forming both a flanged portion for attachment to the inner rail surface and an outwardly extending plate portion terminating in a free end away from the flanged portion, and a lug attached to the free end, projecting downwardly therefrom to hook in the leaf hinge.

8. The object transporting carrier of claim 7 wherein the lug is in the form of a downwardly depending strap.

9. The object transporting carrier of claim 7 wherein the lug is in the form of a downwardly depending pin.

* * * * *